Patented Oct. 23, 1934

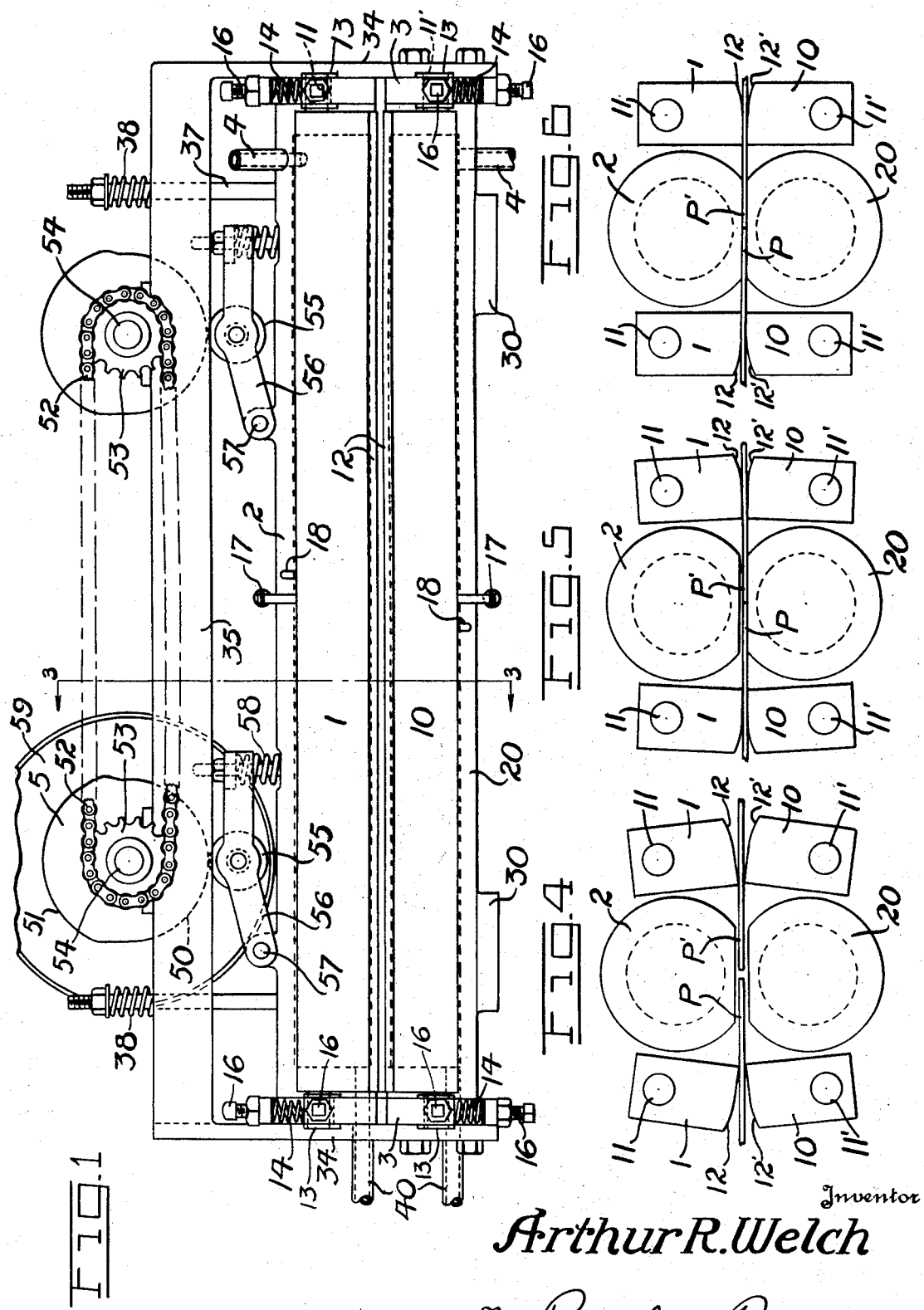

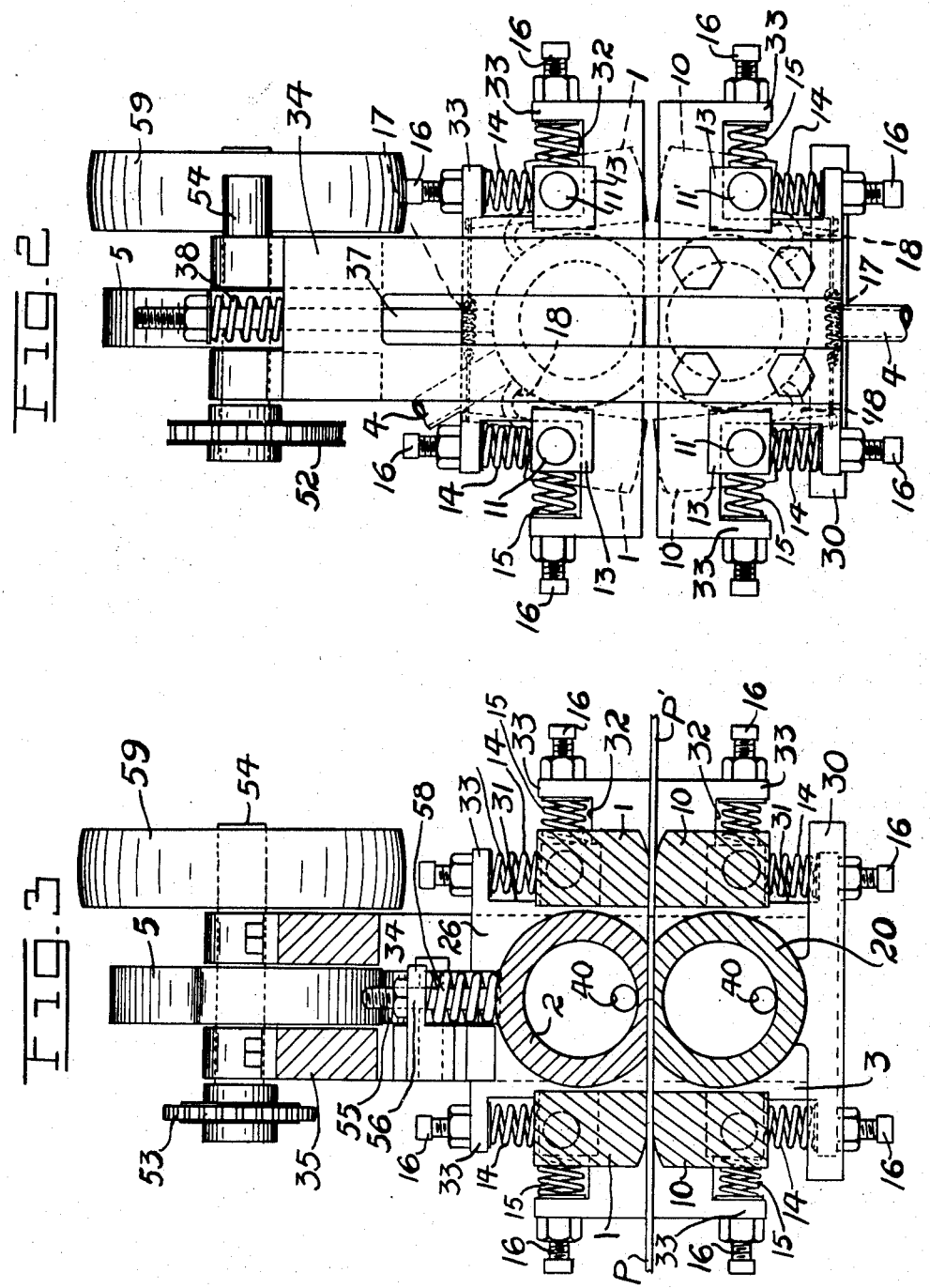

1,977,660

UNITED STATES PATENT OFFICE 1,977,660

PLYWOOD JOINING MACHINE

Arthur R. Welch, Hoquiam, Wash., assignor to Harbor Plywood Corporation, Hoquiam, Wash., a corporation of Delaware Application December 26, 1929, Serial No. 416,685

26 Claims. (Cl. 144—281)

In the manufacture of plywood it is necessary that pieces of varying width, having their edges made straight by cutting or dressing, or otherwise, be joined by fixing their adjacent edges together in edge-abutting contact. Heretofore this operation has been frequently carried out by a taping machine, which applies tape to the two edges to hold them together, after glue has been applied to the two edges, and they are then set aside to permit the glue to set. This involves a number of hand operations, and is obviously a comparatively slow and tedious process, and it necessitates tying up production and equipment during the time of completing the joining operation, and while the glue is setting. It necessitates the removal of the tape thereafter, another tedious and time-consuming operation.

It is a principal object of my invention to provide a means whereby the joining operation can be done substantially automatically, and by machine, and in such a manner that the entire operation can be completed in a few seconds, thus largely eliminating the disadvantages referred to above, and almost entirely avoiding manual handling, especially turning of the plywood.

More specifically, it is my object to provide a machine for joining plywood strips, or articles of similar character, by means of which two adjacent strips are automatically gripped and moved, relative to each other, or one relative to the other, into edge-abutting contact, after which presser or clamping means are brought into action to hold the two abutting edges in a common plane, and, preferably, to heat a previously applied adhesive, such as glue, to cause it to set rapidly.

A further object is to provide a machine of the general character indicated, which will automatically adjust itself to various irregularities in the thickness of the plywood, or irregularities in the surface thereof.

Other objects, and more particularly those which pertain to details of structure and arrangement, will be best ascertained from a study of the accompanying drawings of this specification, and the claims which terminate the same.

My invention comprises the novel parts, and the novel combination and arrangement thereof, as shown in the drawings, described in this specification, and as will be more particularly defined by the claims which terminate the same.

In the accompanying drawings I have shown my invention in a form which is now preferred by me.

Figure 1 is a side elevation of my device, shown in position to receive the plywood.

Figure 2 is an end view of the same, with parts in like position.

Figure 3 is a transverse section on the line 3—3 of Figure 1, showing parts in operative or closed position.

Figures 4, 5, and 6 are diagrammatic views, illustrating the three phases of the operation of the machine.

Essentially, my invention involves the employment of two pairs of jaws, 1 and 10, and two complemental clamping or holding members 2 and 20 (see Figures 4, 5, and 6). Preferably, the jaws 1 and 10 are pivotally supported at 11 and 11', respectively, and extend in general each toward the pivot of the other, but preferably inclined slightly outward. One pair of jaws is positioned at each side of the clamping members 2 and 20, and their inner ends 12 and 12' are formed somewhat divergent outward from their inner edges, that is, the edges nearest the clamping members.

Both the jaws 1 and 10 of each pair, and the clamping members 2 and 20, are normally spaced from each other by an amount sufficient to permit the easy insertion of two pieces of plywood P and P'. Two such pieces of plywood are shown in position in Figure 4. Their adjacent edges would have been made straight, usually by a clipping machine, such as is commonly employed in the plywood art for cutting out bad spots. An adhesive, such as the glue which is used to hold the several plies together, would ordinarily have been placed upon one or both of the edges, thus placed adjacent to each other, but not necessarily in contact. Now, if the jaws 1 and 10, and the clamping members 2 and 20, are caused to approach each its complemental member, and if the timing of the parts is such that the jaws 1 and 10 are first engaged each with its respective piece of plywood, that is, prior to the engagement of the clamping members 2 and 20 with either piece of plywood, (which condition is illustrated in Figure 5), it is obvious that because of the divergent ends 12 and 12' of the jaws 1 and 10 respectively, the engagement of these jaws with the corresponding plywood will cause them to grip that piece of plywood, and to shift it inwardly, that is, toward the other plywood piece, if the edges are not already in contact, so that their edges are brought into butting contact. Obviously, it is desirable that the jaws be somewhat yieldable, so that they may accommodate themselves to plywood pieces of different thickness, and to irregularities of surface which sometimes occur in plywood, and also in order to permit their yielding as soon as the edges of the two pieces of plywood are brought into contact.

Immediately following this, the clamping members 2 and 20 may complete their movement the one towards the other, and between them they will clamp the two abutting edges of the plywood, as is indicated in Figure 6, to maintain the two strips in a common plane. These clamping members 2 and 20 may be suitably heated, as by making them hollow and supplying steam to the interior (by means to be described hereafter), and these heated presser members, coming in contact with the plywood strips, heat them and cause the previously applied glue to set in a few seconds, whereupon the clamping members and the jaws may be released, and the now joined strip of plywood can be withdrawn from the machine.

The various mechanisms for accomplishing these movements may be any which are found suitable, though for simplicity, ease of construction, and certainty of operation, I prefer the means which I will now proceed to describe.

The one clamping member 20 may be fixed in position, supported in a fixed frame 3 or such frame may be supported on and secured to the clamping member 20. This fixed frame may include footings 30, vertical guide edges 31, horizontal guiding edges 32, lugs 33, an upright 34, and a longitudinal bar or support 35, the purposes of all of which will be shortly brought out. The complemental clamping member 2 may be supported in a movable frame 26, guided upon the upright 34 for vertical movement, and likewise having the guiding edges 31 and 32 and the lugs 33. I prefer that guide rods 37 be also secured in the movable clamping member 2, and that it be yieldingly supported through these guide rods and the springs 38, for movement vertically relative to the fixed clamping member 20.

The members 2 and 20 may be suitably heated in various ways, as has already been pointed out, and as a typical means for accomplishing this end I have shown a steam inlet pipe 4 connecting to each of the members 2 and 20, and a drain pipe 40 also connected to each of them, for removing the water of condensation, the two pipes securing circulation of steam through the hollow members 2 and 20.

Guided upon the angularly disposed edges 31 and 32 previously referred to, are pivot blocks 13, in which are pivotally mounted the respective jaws 1 and 10. To maintain these pivot blocks 13 normally in their inner positions, and closest to the clamping members 2 and 20, I provide springs 14 and 15, the tension on which may be adjusted by suitable adjusting screws 16, as may be best seen in Figure 2. The jaws 1 and 10 are held in the position shown in Figure 4, slightly inclined outwardly, by means such as the tension springs 17 extending from the jaw at one side of the clamping members to the corresponding jaw at the other side. Stops 18 limit the inward swing of the upper ends of the jaws, these stops contacting with the adjacent clamping members. In normal position of rest (Figure 4) the inner edges of the jaws lie inwardly of the faces of the clamping members.

Various means may be employed to cause movement of the several parts, and they may be operable independently of each other, or may be coupled for joint and successive operation, the clamping action following immediately after the gripping and shifting action of the jaws. The operation is preferably accomplished in the latter way, and for this purpose I have found it convenient to employ cams 5, having low parts 50 and high parts 51. Two such cams may be employed, or more, depending upon the length of the clamping members and jaws, although one may operate successfully if these members are short enough. Where two or more are employed they may be connected for simultaneous operation by some such means as the chain 52 passing over sprocket wheels 53 upon the respective shafts 54, which support the cams 5. These shafts may be journaled in the cross member 35 of the fixed frame, and the primary movement may be imparted to the cams 5 and their shafts 54 in any suitable fashion, by hand or by automatic machinery. A drive pulley 59 for doing this has been shown.

These cams are shown as bearing upon rollers 55, carried by lever arms 56, which are pivoted by one end at 57 upon the movable clamping member 2, which, as has been explained, is connected to the movable frame, and the other end of the lever 56 is connected through a spring 58 to the same movable clamping member 2. The purpose of this connection is solely to absorb shocks which otherwise might prove harmful to the machine, and to permit the clamping members to yield to accommodate irregularities or variations in the thickness of the plywood strips.

It is believed that the operation and construction of my device is now clear, and it will be clear, too, that various mechanical forms may be adopted for carrying out the invention as described above.

What I claim as my invention is:

1. In a plywood jointing machine, means engageable with each piece of a pair of adjacent, coplanar plywood strips to move their edges into contact, other means engageable with the plywood at each side of the joint, and operable to fix the abutting edges in a common plane, and means supporting the first means from the second, and relatively disposed for operation of the first in advance of the second.

2. In a plywood jointing machine, two pairs of jaws normally spaced to permit insertion therebetween of the adjacent edges of two pieces of plywood to be jointed, each jaw of each pair being pivotally supported and its inner edge extending generally towards but inclined slightly outward relative to a line joining the pivot axes of the two jaws of the pair, means for moving said jaws towards closed position whereby the inner edges of the jaws first engage the corresponding piece of plywood and thereafter rock inwardly as they are pressed into engagement, thereby to move the plywood pieces together into edge contact.

3. In a jointing machine as in claim 2, means for holding the abutting edges of the plywood in a common plane, the operating means for the jaws also operating the holding means, the jaws and the holding means being relatively so disposed as to clamp and hold the plywood immediately following the movement of the pieces into contact.

4. A plywood jointing machine comprising a pair of clamping members, a fixed frame supporting one of said members, a movable frame supporting the other, means for moving said movable frame to advance the corresponding clamping member towards the complemental clamping member, two pairs of jaws, a pair at each side of said clamping members, one jaw of each pair being associated with the fixed member, and the complemental jaw being supported from and movable with the movable member to grip and move inward the adjacent edges of two pieces of plywood positioned in a common plane between the clamping members.

5. A plywood jointing machine as in claim 4, the plywood engaging ends of the jaws being formed and disposed to move inward upon meeting resistance.

6. A plywood jointing machine as in claim 4, including pivot blocks supported upon the fixed frame for movement inwardly and towards the clamping members, other pivot blocks similarly supported upon the movable frame, springs resisting movement of the pivot blocks outwardly or away from the clamping members, a jaw of each pair being pivotally supported in the first set of blocks, and the other jaw being pivotally supported on the other set of blocks, said jaws being formed and disposed to engage the respective plywood pieces prior to their engagement by the clamping members, and to move them inward into edge abutting contact, and means for moving said movable frame to initiate gripping of the jaws and clamping of the clamping members.

7. In a plywood jointing machine, in combination, complemental members normally spaced one above the other to permit insertion therebetween of the adjacent edges of two strips of plywood to be jointed, and each normally disposed at each side of the joint, means to cause approach of said members to contact with the plywood strips and thus hold them in a common plane, and two pairs of jaws, the pairs disposed at opposite sides of the joint, and the two jaws of each pair being supported from and movable with the opposite ones of said complemental members, and disposed in advance of their supporting members to grip the respective plywood strips in advance of contact by the said holding members, the jaws being so shaped and supported as to move the strips inwardly towards each other upon contact therewith, thereby first gripping and laterally shifting the plywood strips into edge contact, prior to their being clamped between the holding members.

8. A plywood jointing machine as in claim 7, the jaws being yieldably supported upon the respective strip-holding members to yield both in a direction normal to the plane of the strips and laterally in such plane.

9. A plywood jointing machine as in claim 7, the jaws being yieldably supported upon the respective strip-holding members to yield both in a direction normal to the plane of the strips and laterally in such plane, and the strip-engaging portions of the jaws being relieved from such plane from their inner edge outwards, whereby as they are pressed into engagement by the approach of their supporting members they are thrown inwardly.

10. A plywood jointing machine as in claim 7, the means to cause approach of the strip-holding members comprising cam means engaging the upper member to press it downwardly.

11. A plywood jointing machine as in claim 7, one of the strip-holding members being fixedly positioned, and the other being guided thereon for movement towards the first, one jaw of each pair being yieldingly supported from the fixed member, and the complemental jaw of each pair being yieldingly supported from the movable member.

12. In a plywood jointing machine, two pairs of jaws normally spaced to permit insertion therebetween of the adjacent edges of two pieces of plywood to be jointed, each jaw of each pair being pivotally supported and extending towards its complemental jaw, the adjacent ends of the complemental jaws, in normal released position, being relieved outwardly from an inner edge, such inner edges lying inwardly of a plane joining the pivot axes of the jaws, and means to cause approach of the jaws, whereby the inner edges first contact with the plywood piece, and move inwardly as the jaws rock and the relieved ends are pressed into contact with the plywood.

13. A plywood jointing machine as in claim 12, and means interposed between the two pairs of jaws for maintaining the plywood pieces in a common plane.

14. A joining machine as in claim 12, and means permitting yielding of the pivots of the jaws in a direction normal to the plane of the plywood pieces, and outwardly.

15. In a plywood jointing machine, a member for supporting the adjoining edges of two pieces of plywood to be jointed, a gripping member positioned above each of two pieces thus supported, pivotally supported and extending generally downward towards the same, but inclined slightly relative to a plane through the pivot axis and normal to the plane of the plywood, the lower end of each of the gripping members being relieved outwardly from the inner edge, and means to move the gripping members towards the plywood, the inner edge contacting first, and moving inwardly as the movement progresses, to rock the gripping members and move the plywood engaged thereby inwardly.

16. The combination of claim 15, the means for moving the gripping members being common to both members, to cause simultaneous movement of the two members, and the respective plywood pieces engaged thereby.

17. The method of jointing plywood strips or the like, which comprises placing two strips in a common plane, with their edges adjacent and roughly parallel, applying a yieldable force to the two strips to clamp them, and simultaneously acting in a direction to press their adjacent edges into butting contact wherever they are not already in contact, and thereafter applying heat along the butted edges to set a previously applied adhesive.

18. The method of jointing plywood strips or the like, which consists in placing two strips in a common plane, with their edges adjacent and roughly parallel, applying a yieldable force to the two strips to clamp them, and simultaneously acting in a direction to press their adjacent edges into butting contact notwithstanding possible departure from parallelism, thereafter clamping and holding the strips across the joint to maintain them thus in contact, then applying heat along the butted edges to set a previously applied adhesive, while the strips are clamped in position.

19. Machine for edge-gluing veneer strips comprising two pairs of members, one member of each pair engaging the bottom and the other the top of a ply, and each pair engaging one of the two strips to be joined, and means supporting the members of the two pairs for movement towards the complemental member, and for movement towards the other pair upon meeting the resistance of the ply.

20. Machine for edge-gluing veneer strips comprising a support, two spaced members disposed above the support, means to move the two members towards the support, and means supporting and guiding said members for movement towards each other upon engaging plies upon the support.

21. A machine of the class described including opposed movable blocks, means for urging said blocks toward each other, opposed presser feet movably mounted in said blocks upon opposite sides of the center, and adapted to be moved toward each other as the blocks are moved together, and means for urging said blocks apart upon release of the first means.

22. A machine of the class described including opposed movable blocks, means for urging said blocks toward each other, opposed presser feet movably mounted in said blocks upon opposite sides of the center and adapted to be moved toward each other as the blocks are moved together, and means for urging said blocks apart upon release of the first means, and heating elements carried by said bodies and positioned between the presser feet.

23. A machine of the class described including spaced standards, movable bodies mounted upon said standards, means for urging said bodies toward each other, means for urging said bodies away from each other upon release of the first means, presser feet movably supported by the bodies and arranged upon opposite sides of the center thereof with their outer faces normally projecting beyond the opposed faces of the body, means for urging the presser feet toward the center of the bodies when the bodies are moved toward each other and moving the presser feet away from the center when the bodies are moved away from each other, and means for limiting the movement of the presser feet in either direction.

24. A machine of the class described including spaced standards, movable bodies mounted upon said standards, means for urging said bodies toward each other, means for urging said bodies away from each other upon release of the first means, presser feet movably supported by the bodies and arranged upon opposite sides of the center thereof with their outer faces normally projecting beyond the opposed faces of the bodies, means for urging the presser feet toward the center of the bodies when the bodies are moved toward each other and moving the presser feet away from the center when the bodies are moved away from each other, and means for limiting the movement of the presser feet of each body.

25. A machine of the class described including opposed movable blocks, means for moving said blocks toward each other, opposed pressure feet movably mounted in said blocks and adapted to be moved toward each other as the blocks are moved toward each other, and means for urging said blocks apart upon release of the first means.

26. The method of jointing plywood strips or the like, which comprises placing two strips in a common plane, with their edges adjacent and approximately parallel, applying a force to each of the two strips to clamp it, and simultaneously acting in a direction to press their adjacent edges into butting contact, and applying a force along the butted edges to maintain the two strips coplanar in this zone, during setting of a previously applied adhesive.

ARTHUR R. WELCH.